United States Patent

[11] 3,551,703

[72] Inventor Vincent E. Bischoff
River Grove, Ill.
[21] Appl. No. 708,966
[22] Filed Feb. 28, 1968
[45] Patented Dec. 29, 1970
[73] Assignee A. B. Dick Company
Chicago, Ill.
a corporation of Illinois

[54] ANALOG SWITCHING DEVICE
5 Claims, 2 Drawing Figs.

[52] U.S. Cl. .......... 307/254, 307/259; 328/99
[51] Int. Cl. .......... H03k 17/60, H03k 17/16
[50] Field of Search .......... 307/259; 328/99, 254, 259

[56] References Cited
UNITED STATES PATENTS

| | | | |
|---|---|---|---|
| 2,657,318 | 10/1963 | Rack | 307/259 |
| 3,146,357 | 8/1964 | Spallone | 307/259 |
| 3,289,089 | 11/1966 | Linder | 307/259 |

*Primary Examiner*—Donald D. Forrer
*Assistant Examiner*—Harold A. Dixon
*Attorneys*—Samuel Lindenberg and Arthur Freilich

ABSTRACT: A switching circuit for switching analogue signals is provided wherein a difference amplifier has diode switches connected thereto in a manner such that the analogue signal at the input is amplified and passed to the output while the switching control signal levels are canceled and also without affecting the DC level of the signals being switched.

INVENTOR.
VINCENT E. BISCHOFF
BY Lindenberg & Freilich
ATTORNEYS

ANALOG SWITCHING DEVICE

BACKGROUND OF THE INVENTION

1. Field of the Invention

This invention relates to solid-state switching devices and more particularly to an improved video switching device.

2. Description of the Prior Art: 9

A problem arose in connection with a TV display system to enable the selection of one or more of a plurality of video signals which were available, for the purpose of displaying those video signals on a monitor screen. It was found that the usually accepted switching circuits would cause a flash to occur on the screen due to a switching spike or a noise, or some of the switching signal is fed through to the display screen. Also, the DC level of the input signals is shifted when shifting from channel to channel.

OBJECTS AND SUMMARY OF THE INVENTION

An object of this invention is the provision of a switching circuit which eliminates noise signals.

Another object of this invention is the provision of a novel switching circuit which can switch in an interval less than a microsecond.

Still another object of the present invention is the provision of the video switching circuit which will not introduce a DC shift at its output while being switched.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
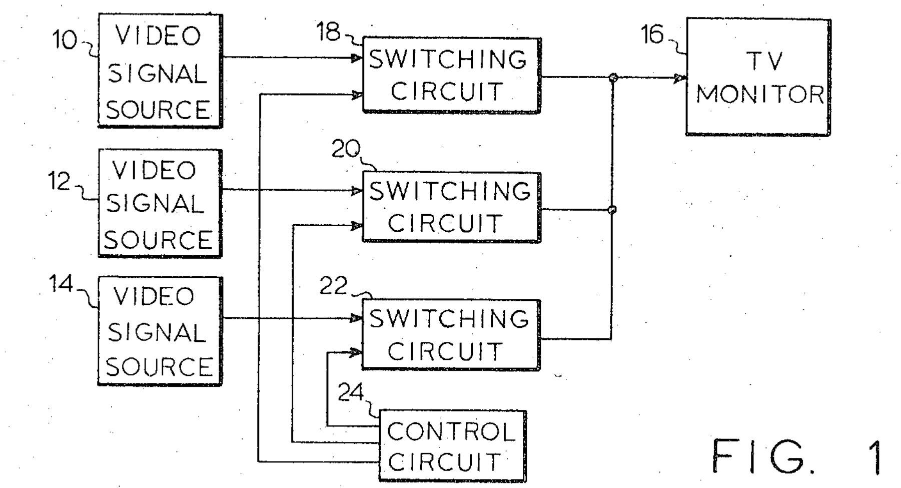
FIG. 1 is a block schematic diagram illustrative of an arrangement of the type wherein the need for this invention arose.

FIG. 1 is a block diagram of an arrangement for switching one of a plurality of sources of video signals, respectively 10, 12 and 14 to a TV monitor 16. Each video signal source is connected to a respective switching circuit 18, 20 and 22. The selection of one of the switching circuits which is closed to pass video signals is under the control of a control circuit 24.

The arrangement shown in FIG. 1 is representative of a situation such as, for example, one which occurs when a character generator generates a plurality of character-representative video signals. The video signals from this plurality of character representative video signal sources 10, 12, 14 which are to be displayed on the TV monitor 16 is determined by a control circuit 24 which operates the switching circuits 18, 20, 22. The problem which arises is that in the course of applying the video signals in the initial switching process, noise signals occur either as a result of the application of the enabling signals from the control circuit or of the operation of the switching circuit. Since the switching operation is repetitive with a continuous display, these extraneous signals can constitute both a source of irritation as well as a displeasing display. Also, in many cases, DC level changes occur in switching between switching circuits or even in switching the same circuit on. This results in the different characters of the display being displayed with different brightness levels.

Figure 2:
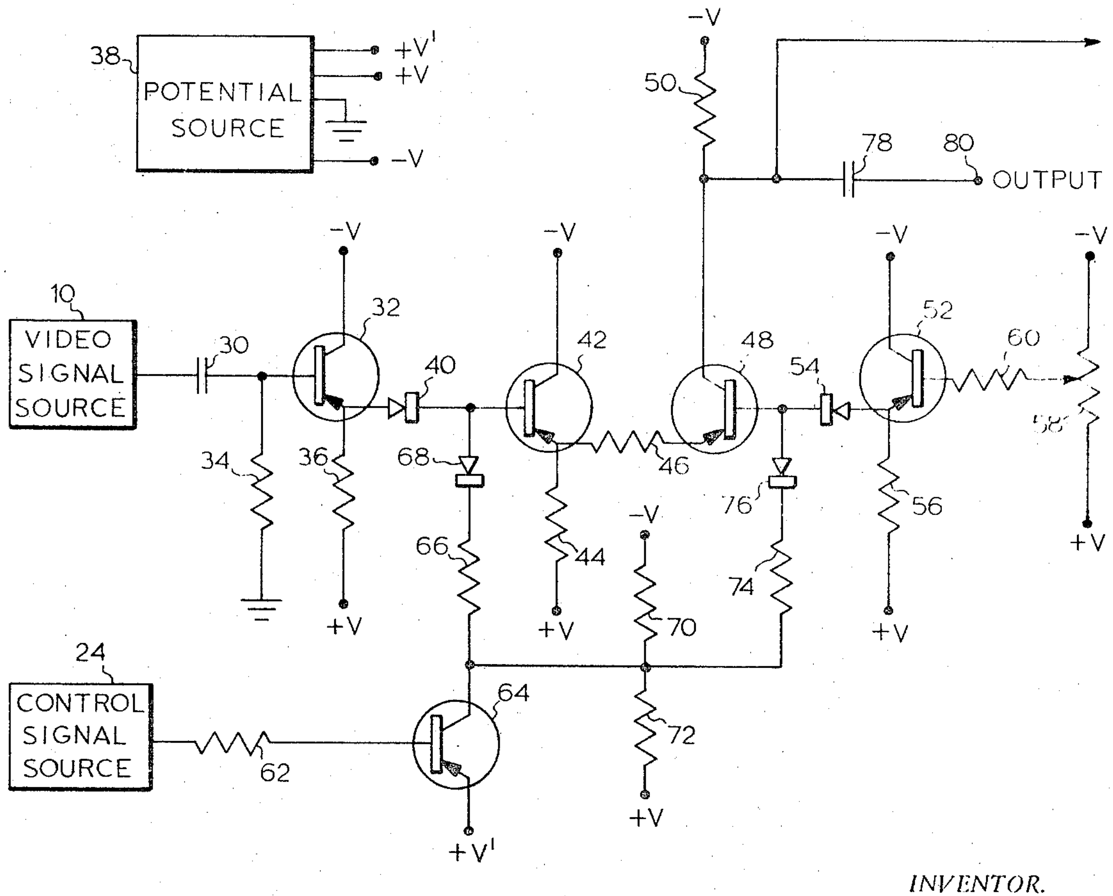
FIG. 2 is a circuit diagram of an embodiment of the invention.

FIG. 2 shows a switching circuit arrangement in accordance with the present invention. Video signals from a source, such as 10, are applied through a coupling capacitor 30 to the base of a transistor 32. The transistors which are shown in FIG. 2 are all PNP transistors. Those skilled in the art will readily appreciate, from the teachings herein how to use NPN transistors. Accordingly, the description of the invention, employing PNP transistors, should be considered as illustrative and not as a limitation upon the invention.

The base of the transistor 32 is connected to ground through a ground return resistor 34. The emitter of transistor 32 is connected through a resistor 36 to the positive terminal +V of a potential source 38. The collector of transistor 32 is connected to the negative terminal −V of the transistor potential source 38.

A diode 40 is used to couple the emitter of transistor 32 to the base of transistor 42. The collector of this transistor 42 is connected to the negative terminal −V of potential source 38, the emitter of this transistor 42 is connected through a resistor 44 to the positive terminal +V of potential source 38. The emitter of transistor 42 is connected through a coupling resistor 46 to the emitter of a transistor 48. The collector of transistor 48 is connected through a resistor 50 to the negative terminal −V of potential source 38. The transistor 52 has its collector connected to the negative potential terminal −V of source 38. Its emitter is coupled through a diode 54 to the base of transistor 48. Its emitter is also connected to the positive terminal +V of potential source 38 through a resistor 56. The base of transistor 52 is connected to the slider of a potentiometer 58 through a resistor 60. The potentiometer 58 is connected across the positive −V and negative +V terminals of potential source 38.

Control signals from the source 24 are applied through a resistor 62 to the base of a transistor 64. The emitter of this transistor is connected to the positive terminal +V′ of potential source 38. The collector of this transistor is connected through a resistor 66 and a diode 68 to the base of transistor 42. The collector of transistor 64 is also connected to a tap on a voltage divider consisting of resistors 70 and 72, connected in series and across the potential terminals +V and −V of source 38. The collector transistor 64 is also connected through a resistor 74, connected in series with a diode 76, to the base of transistor 48.

In the circuit arrangement shown in FIG. 2, transistors 42 and 48 form a difference amplifier. Transistor 52 and its associated circuitry are employed to provide a dummy signal source whose impedance characteristic is substantially identical with that appearing at the emitter of transistor 32. A DC control current for the diodes 68 and 76 is provided by the voltage divider 70, 72 and is controlled by transistor 64. The amplitude of the DC transition, at the collector of transistor 64, in response to a signal is limited by the voltage divider 70, 72. Thus, the identical DC currents which are applied to the difference amplifier are canceled. However, since the input analogue signal is applied to only one side of the difference amplifier, it is passed and amplified thereby.

To place the switching circuit in its on state, the base of the control transistor 64 is made positive by a signal from the control signal source the transistor is driven to its off state, allowing the collector to become negative with respect to the emitters of transistors 32 and 52, causing diodes 40 and 54 to conduct, thereby passing the video signal from the emitter of transistor 32 to the input of the difference amplifier. A DC signal is conducted through diode 54 to the other input of the difference amplifier. The shunting effect of diodes 68 and 76 on the signals is minimized by the effect of resistors 66 and 74.

When the base of the control transistor 64 is not made positive the transistor is conductive. Its collector is positive with respect to the emitters of transistors 32 and 52, thereby completely blocking diodes 68 and 76, and therewith diodes 40 and 54, whereby no respective video and DC signals may be passed to the bases of transistors 42 and 48.

The gain of the circuit can be varied by changing the value of the coupling resistor 46. Mismatch in the transistors and/or other components can be compensated for by adjusting the bias derived from the potentiometer 58.

When the switch is in its "OFF" state, so that no video signals are being transmitted therethrough, its load resistor 50 is available for use by any of the other switching circuits. Accordingly the resistor 50 may be connected as the collector load resistor for the other switching circuits.

There has accordingly been described a novel and useful switching circuit which can switch an analogue signal at its input without introducing a DC shift at its output and which provides for cancellation of any noise signals which may be introduced as a result of the application of the control or switching signal thereto.

Although particular embodiments of the invention have been described and illustrated herein, it is recognized that modifications and variations may readily occur to those skilled in the art and consequently it is intended that the claims be interpreted to cover such modifications and equivalents.

I claim:

1. A circuit for switching input signals from a source to an output terminal comprising:
 a difference amplifier including a first and second transistor each having base collector and emitter electrodes;
 means connecting said emitter electrodes of said first and second transistors together;
 means for applying operating potential to the collectors and emitters of said first and second transistors including a load resistor connected in series with said second transistor collector and a load resistor collector and a load resistor connected in series with said first transistor emitter;
 means for applying signals from said source to the base of said first transistor;
 means for applying a bias to the base of said second transistor;
 diode blocking means connected to the respective first and second transistor bases for preventing the application of signals thereto;
 means for rendering said diode blocking means inoperative whereby signals applied to said first transistor base appear at said first and said second transistor collector, including:
 a first resistor,
 a second resistor,
 a third transistor having base collector and emitter electrodes;
 means for applying a bias potential to said transistor emitter to render it conductive;
 means for connecting said transistor collector to said diode blocking means;
 a source of positive operating potential;
 means connecting said first resistor from said source of positive operating potential to said third transistor collector;
 a source of negative operating potential;
 means for connecting said second resistor between said source of negative operating potential and said transistor collector;
 means for applying a signal to said third transistor base to render it nonconductive whereby said diode blocking means are rendered inoperative; and
 means for connecting said second transistor collector to said output terminal.

2. A circuit as recited in claim 1 wherein said means for applying an input signal to the base of said first transistor is a fourth transistor having collector, emitter and base;
 means for applying signals from said source to the base of said fourth transistor;
 means for applying operating potential to the collector and emitter of said fourth transistor; and
 a diode coupling said fourth transistor emitter to the base of said first transistor.

3. Apparatus as recited in claim 1 wherein said means for applying a bias to the base of said second transistor includes:
 a fifth transistor having collector emitter and base;
 means for applying a biasing potential to the base of fifth transistor;
 means for applying an operating potential to the collector and emitter of said fifth transistor; and
 a diode connecting said fifth transistor emitter to said second transistor base.

4. A circuit for transferring signals from a source of signals to an output terminal including:
 first, second, third, fourth and fifth transistors each having collector emitter and base electrodes;
 means coupling said first and second transistors into a difference amplifier including a first resistor connecting the emitters of said first and second transistors together;
 a second transistor connected in series with the emitter of said first transistor; and
 a third resistor connected in series with the collector of said second transistor;
 means connecting the collector of said second transistor to said output terminal;
 a source of operating potential;
 means connecting the emitter of said first transistor and the collector of said second transistor to said source of operating potential;
 means connecting said third resistor to said source of operating potential;
 means for applying a bias to the base of said second transistor including voltage divider means connected to said source of operating potential;
 means connecting said voltage divider means to the base of the third of said transistors;
 means connecting the collector of said third transistor to said source of operating potential;
 a fourth resistor connecting the emitter of said third transistor to said source of operating potential;
 and a first diode connecting the emitter of said third transistor to the base of said second transistor;
 means for applying input signals to the base of said first transistor including means for connecting input signals to the base of said fourth transistor;
 means connecting the collector of said fourth transistor to said operating potential source;
 a fifth resistor connecting the emitter of said fourth transistor to said operating potential source;
 a second diode connecting the emitter of said fourth transistor to the base of said first transistor;
 means for controlling the transfer of said input signals to said output terminal by said difference amplifier including means for applying control signals to the base of said fifth transistor;
 means connecting the collector of said fifth transistor to the base of said first transistor including a third diode and sixth resistor connected in series therewith;
 means connecting the collector of said fifth transistor to the base of said second transistor including a fourth diode and a seventh resistor connected in series between said base and collector;
 means connecting the emitter of said fifth transistor to said source of operating potential;
 a voltage divider connected across said source of operating potential; and
 means connecting said voltage divider to the collector of said fifth resistor.

5. A circuit for switching input signals from a source to an output terminal comprising:
 a difference amplifier having a first and a second input and an output, a first diode connected to said first difference amplifier input, means for applying signals from said source to said first diode;
 a second diode connected to said second difference amplifier input;
 means connecting said third diode between said transistor collector and said difference amplifier first input;
 a fourth diode;
 means connecting said fourth diode between said transistor collector and said difference amplifier second input;
 a positive source of operating potential;
 a first resistor connecting said positive source of operating potential to said transistor collector;
 a negative source of operating potential;

a second resistor connecting said negative source of operating potential to said transistor collector;

means for biasing said transistor conductive connected to said transistor emitter; and means for applying a control signal to said transistor base to render it nonconductive when it is desired to enable signals from said source to appear at said difference amplifier output.